United States Patent Office 3,129,176
Patented Apr. 14, 1964

3,129,176
NOVEL SILICEOUS AMINO COMPOUNDS AND PROCESS OF PREPARING THE SAME
Frederick J. Ihde, Jr., Mountain Lakes, N.J., assignor to Nopco Chemical Company, Newark, N.J., a corporation of New Jersey
No Drawing. Filed Jan. 17, 1962, Ser. No. 166,907
20 Claims. (Cl. 252—21)

This invention relates to novel siliceous amino compounds. More particularly, this invention relates to metal complexes of siliceous amino compounds.

Siliceous amino compounds and their preparation are disclosed and claimed in U.S. Patent No. 2,967,828, Ihde, issued January 1961. In addition to the above, siliceous amino compounds and their preparations are described in copending applications Serial Nos. 836,086, filed August 26, 1959; 86,323, filed February 1, 1961; 107,320, filed May 3, 1961; 121,350, filed July 3, 1961; and 138,566, filed September 18, 1961.

Although the siliceous amino compounds prepared via the aforementioned patent and patent applications are excellent products, it was realized that when a siliceous amino compound was prepared using a partial amide salt having at least one primary amine group thereon, the resultant product suffered from a number of disadvantages. For example, it was found that the mechanical stability of a grease prepared using such a siliceous amino compound was not as good as was believed possible. Moreover, such siliceous amino compounds did not grind as easily as was believed possible. In addition, when such siliceous amino compounds were used in preparing silicone rubbers, the catalyst which was used during the preparation was poisoned and the resultant silicone rubber suffered. Moreover, when such siliceous amino compounds were used in preparing polyester and epoxy systems, the cure time of these materials was accelerated to the extent that the shelf life of these systems was materially reduced.

All of these disadvantages were believed due to the presence of free reactive amine groups. It is believed that these free reactive amine groups were present even after the siliceous amino compound was formed. Accordingly, it was realized that by eliminating the effect of the free reactive amine groups, siliceous amino compounds prepared using partial amide salts having at least one primary amine group thereon could be utilized in many new fields and the present utilization of these compounds could be increased.

An object of this invention therefore is to improve the mechanical stability of greases prepared using siliceous amino compounds themselves prepared using a partial amide salt having at least one primary amine group thereon.

Another object is to prepare novel siliceous amino compounds from partial amide salts having a primary amine group, said siliceous amino compound being more suitable for use in preparing epoxy resins, polyesters, silicone rubbers, etc.

Other objects and advantages will become apparent from the following more complete description and claims.

Broadly, this invention contemplates a composition of matter prepared in an aqueous system by contacting (1) a material comprising a partial amide salt having at least one primary amine group thereon, with (2) a water soluble silicate salt selected from the class consisting of sodium silicates, potassium silicates, and ammonium silicates, and then (3) contacting under alkaline conditions, the product of (1) and (2), with a second material selected from the class consisting of the elements of the periodic table of group I-B, group II-A having an atomic weight of up to about 25, group II-B, group III-A having an atomic weight of at least about 25, group III-B having an atomic weight of up to about 89, group IV-A having an atomic weight of at least about 50, group IV-B, group V-A having an atomic weight of between about 120 and 210, group V-B, group VI-B having an atomic weight of up to about 100, group VIII, manganese and rhenium, water-soluble inorganic salts of said elements, and water-soluble organic salts of said elements wherein said organic salt has up to about 4 carbon atoms.

This invention also contemplates a process of preparing a siliceous amino compound comprising contacting in an aqueous system (1) a material comprising a partial amide salt having at least one primary amine group thereon with (2) a water-soluble silicate salt selected from the class consisting of sodium silicates, potassium silicates, and ammonium silicates, and (3) adding under alkaline conditions, to the product of (1) and (2), a second material selected from the class consisting of the elements of the periodic table of group I-B, group II-A having an atomic weight of up to about 25, group II-B, group III-A having an atomic weight of at least about 25, group III-B having an atomic weight of up to about 89, group IV-A having an atomic weight of at least 50, group IV-B, group V-A having an atomic weight of between about 120 and 210, group V-B, group VI-B having an atomic weight of up to about 100, group VIII, manganese and rhenium, water-soluble inorganic salts of said elements, and water-soluble organic salts of said elements wherein said organic salt has up to about 4 carbon atoms.

As used herein, the term metal complexed siliceous amino compound includes a metal complexed or reacted with a siliceous amino compound as well as a water-soluble metal salt complexed or reacted with a siliceous amino compound.

As used in the specifications and claims, the term siliceous amino compounds encompasses products which contain only silica combined with a partial amide salt containing at least one primary amine group or mixtures of partial amide salts wherein at least one of said mixture contains at least one primary amine group, and products which contain both uncombined silica and silica combined with partial amide salts and mixtures thereof as aforedescribed.

The terms filtration and filtering, as used in the specifications and claims, encompass dewatering the siliceous amino compound by mechanically passing water through the siliceous amino compound particles. Thus, the terms encompass dewatering the siliceous amino compound using a Büchner funnel, a conical funnel and conical filter paper, a filter press, centrifuging, and the like. When a siliceous amino compound is filtered gravitationally using a conical funnel and conical filter paper, the filtration is quite slow and for that reason we do not prefer to filter in this manner.

Generally speaking, the siliceous amino compounds contemplated in this invention can be prepared by reacting a water-soluble silicate salt such as sodium silicate, potassium silicate, ammonium silicate, and the like with a partial amide salt and mixtures of partial amide salts containing at least one primary amine group. After the siliceous amino compound is formed, a metal or metal salt is then reacted with the product in the reaction slurry. If desired, a metal or metal salt can be reacted with a siliceous amino compound which has been recovered, dried and even ground. This can be accomplished by preparing an aqueous slurry of the dried siliceous amino compound, which may or may not have been ground, and thereafter contacting, under alkaline conditions, a metal or metal salt with the aqueous slurry of the siliceous amino compound.

While the above is the basic reaction, conditions may be varied in that excess silicate salt can be used. When excess silicate is used, the resultant siliceous amino compound contains fine particles of silica and the siliceous amino compound is absorbed and/or complexed upon the surface of the silica. For example, the excess silicate salts may be converted to a colloidal fine silica such as a silica gel or sol by treating the silicate salt with an acid such as sulfuric acid. Thereafter a stoichiometric amount of the silicate is reacted with a partial amide salt or mixture thereof, in the presence of said gel or sol, and subsequently reacted with a metal or metal salt. Alternatively, the partial amide salt or mixture thereof may be initially reacted with an excess of the silicate salt and the excess silicate salt then converted to silica, or both of the above methods for preparing a siliceous amino compound containing free silica may be combined, i.e., excess silicate may be converted to a colloidal fine silica and the partial amide salt or mixture thereof may then be reacted with additional excess silicate salt and the excess silicate salt may then be converted to free silica by treatment with an acid such as hydrochloric acid and the like. Up to about 95% by weight of free and combined silica may be present in the compositions of this invention. If free silica is present, there may be present up to 85% by weight of free silica based on the weight of the entire composition.

The partial amide salts which can be used in this invention must contain at least one primary amine group. Partial amide salts having at least one primary amine group thereon, or mixtures of partial amide salts wherein at least one of said mixtures has at least one primary amine group can be used.

In general, the compositions of this invention can be prepared using polyamines containing two or more amino groups, and at least one primary amine group. Among such polyamines may be mentioned ethylenediamine, diethylenetriamine, tetraethylenepentamine, diaminobutane, triethylenetetraamine, and the like, and derivatives of said polyamines having alkyl, hydroxy, alkloxy, groups substituted for a hydrogen of an amino group thereof, such as 3-dimethyl amino propyl amine and the like.

The partial amides can be prepared by reacting a monocarboxylic acid such as caprylic acid, stearic acid and the like with a polyamine containing two or more amino groups so that the resultant partial amide has at least one amide group and at least one primary amine group.

A monocarboxylic acid need not necessarily be used to prepare the partial amides used in this invention. Partial amides can also be prepared using the following materials; natural or hydrogenated glycerides such as cottonseed oil, acyl halides such as stearyl chloride, and similar materials.

Mixtures of short chain partial amides and long chain partial amides where at least one partial amide of a mixture of partial amides contains at least one primary amine group can also be used in preparing the partial amide salts. Examples of mixtures of short and long chain partial amides are a mixture of (1) the reaction product of a polyamine with a 4 or 5 carbon acid such as butyric acid, valeric acid, crotonic acid, alpha-chloro butyric acid and the like and (2) the reaction product of a polyamine with an acid of at least 12 carbon atoms such as lauric acid, tridecylic acid, myristic acid, pentadecylic acid, margaric acid, stearic acid, nondecyclic acid, arachidic acid, oleic acid, linoleic acid, ricineolic acid, palmitic acid, hydrogenated tallow fatty acids, naphthenic acid, tall oil acids, abietic acid and the like. The above mixtures may be used as long as at least one of the mixtures contains a primary amine group.

The partial amide salts are easily prepared by reacting the partial amides with an acid. Among the acids which can be used are acetic acid, propionic acid, hydrochloric acid, sulfuric acid, phosphoric acid and the like.

However, this invention is not to be construed as limited to any particular mode of preparation of partial amides or their salts as the methods by which these are prepared are well-known in the art. Neither is this invention to be construed as limited to the partial amides or their salts specifically disclosed here as other partial amides and partial amide salts can be used in this invention, and those listed above are presented merely for illustrative purposes only.

The metals or metal salts which are used are believed to react or complex with the free amine group remaining after the siliceous amino compound is formed; however, the nature or mode of the reaction is not established, and the above statement is not to be construed as limiting the scope of this invention.

An amount of the metal or metal salt can be used up to an amount sufficient for the reaction or complexing of one mole of the metal or metal salt with each mole of the free reactive amine group. Lesser or greater amounts can be used if desired, but generally one mole of metal or metal salt for each mole of free reactive amine group is sufficient. The amount of reactive amine groups may be determined by titrating a sample of the reaction slurry, after the siliceous amino compound is formed, with an acid to give the percent of total alkali, and calculating from this, the amount of free reactive amine groups present.

In order to form the complex, the metal or metal salt is added to the reaction slurry after the siliceous amino compound is formed. At the time of this addition, the pH of the slurry should be alkaline, i.e., at least just in excess of 7.0. No maximum pH limit need be specified since the process can be accomplished under alkaline conditions so long as the pH is at least just in excess of 7. However, should it be found that upon addition of the metal salt a hydroxide or oxide precipitates out, then it is only necessary that the pH be lowered, but still kept in excess of 7. The pH can be lowered using any acid such as hydrochloric, phosphoric, sulfuric, oxalic and the like. If the pH is below the specified minimum, an acceptable product will not be obtained. When adjusting the pH upward to that which is desired, any suitable base can be used. Exemplary of such bases are sodium hydroxide, potassium hydroxide, sodium silicate, potassium silicate, potassium carbonate, and the like. However, a base which is an amine or ammonium base should not be used because the metal or metal salt may complex with them. These amines or ammonium bases however might be used if employed in small quantities, i.e., about 1% based upon the weight of the theoretical yield of non-metal complexed siliceous amino compound plus free silica if any.

After the metal complex is formed, the pH should preferably be adjusted to between about 6.5 and 8. If the pH is adjusted to below 6.5, the product which was formed may break down. If the pH is adjusted above 8, then any excess silicate salt present may not be converted to silica and processing difficulties, such as slow filtration rates, may occur.

The metals and metal salts which can be used are the metals and water-soluble salts of metals disclosed in the periodic chart as belonging to the following groups; group I–B, group II–A having an atomic weight of up to about 25, group II–B, group III–A having an atomic weight of at least about 25, group III–B having an atomic weight of up to about 89, group IV–A having an atomic weight of at least about 50, group IV–B, group V–A having an atomic weight of between about 120 and 210, group V–B, group VI–B having an atomic weight of up to about 100, managanese and rhenium from group VII, and group VIII.

Among the metals and metal salts which can be used in this invention according to the above classification, are those metals and metal salts which are known to form amines or nitrogen compound complexes. Among such metals may be mentioned copper, cadmium, chromium, cobalt, nickel, zinc, ruthenium, iridium, iron, rhenium, paladium, platinum, gold, silver, titanium, zirconium, hafnium, aluminum, beryllium, bismuth, mercury, germanium, gallium, lead, antimony, yttrium, vanadium, tantalum, scandium, manganese, molybdenum, and indium and/or their salts, such as copper acetate, copper formate, ferrous acetate, ferrous sulfate, silver acetate, antimony trichloride, zinc sulfate, zinc acetate, aluminum nitrate, nickel phosphate, aluminum iodide, auric chloride, beryllium fluoride, beryllium nitrate, and the like. Where the metal itself is used, it may be placed in the reaction slurry as a sheet, wire, rod, or in powder form, or in any other suitable form.

Additives, such as fluosilicic acid or a water-soluble fluosilicate salt may also be added as described in co-pending application Serial No. 86,323. Generally speaking, the fluosilicic acid or fluosilicate salts may be present at any stage of the preparation as long as it is present either before or during the formation of the siliceous amino compound. Among the water-soluble fluosilicate salts which can be used are sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like.

In all the aforedescribed methods and their variations for preparing a siliceous amino compound, one or more water insoluble organic liquids as described in copending application Serial Number 836,086, filed August 26, 1959, may be used in preparing a siliceous amino compound according to this invention. The water-insoluble organic liquid, if used, must be present no later than when the siliceous amino compound is formed, that is before a metal or metal salt is added to the reaction slurry if said liquid is to be of optimum value. Some of the water-insoluble organic liquids which can be used are Varnish Makers' and Painters, Naphtha, xylene, n-butanol, capricaldehyde, benzene, vegetable and fish oils, and the like more fully described in the above-identified application which disclosure is hereby incorporated into the present case by reference.

When the reaction is complete, that is after the siliceous amino compound is formed and after a metal or metal salt has been complexed with the free amine groups, the freeze-thaw procedure, as described in copending application Serial No. 138,566, filed September 18, 1961, may be used, if desired, provided that a mixture of short and long chain partial amides as aforedescribed has been used. If the freeze-thaw procedure is to be utilized, water may be initially removed in any manner which will assure the presence of the siliceous amino compound as a cake. Thus, water may be initially removed by filtering the reaction slurry, by centrifuging, by using a filter press and the like. Alternatively, water can be initially removed using any combination of water removal processes so long as a cake is obtained after the initial water removal. Thus, the water can first be drained off if two layers form, and then the remaining material can be filtered or centrifuged to initially remove the water and obtain a cake.

After the siliceous amino compound containing the metal complex is filtered, or centrifuged, or the like, the cake is then frozen if it is desired to utilize the freeze-thaw procedure. The cake may be frozen in any type of conventional apparatus and the temperature employed is not critical except that the temperature must be sufficient to freeze the cake. The cake is kept in a frozen condition for as long as is desired before it is thawed out. The length of time that the cake is kept frozen is not critical, and the cake may even be thawed out immediately after it is frozen.

When the cake is thawed out, any temperature up to and including the boiling point of the liquids present in the apparatus employed, or of an azeotrope, if one is formed, can be used.

We have found that by freezing the cake we may remove as much as 20% or more of the water remaining after the initial dewatering.

In order to illustrate the nature of this invention and the manner of practicing the same, the following examples are presented.

EXAMPLE I

The purpose of this example is to set forth the preparation of a metal complexed siliceous amino compound and the preparation of a siliceous amino compound wherein no attempt was made to prepare a metal complexed siliceous amino compound. In both preparations, excess silicate salt was used so that the final product contained free silica. Greases prepared using these two siliceous amino compounds were then compared with one another.

(A) *Preparation of Sodium Silicate Dilution*

250 grams of a 40° Bé. sodium silicate ($Na_2O:3.22SiO_2$) solution was diluted with 1600 cc. of water and then agitated while heating to 80° to 85° C.

(B) *Preparation of Partial Amide Acetate Salt*

30.0 grams of the monoamide of hydrogenated tallow fatty acids and tetraethylene pentamine was melted at a temperature of from 80° to 85° C. and 12.8 grams of glacial acetic acid then added thereto in order to form the partial amide acetate salt. The partial amide acetate salt was then dissolved in 551.7 cc. of water at a temperature of from 85° to 90° C.

(C) *Preparation of Siliceous Amino Compound*

The partial amide acetate salt solution was slowly added to the sodium silicate solution with agitation. The reaction slurry was agitated for 15 minutes at a temperature of 80° to 85° C. in order to form the siliceous amino compound.

(D) *Preparation of the Metal Complex*

16.6 grams of copper sulphate ($CuSO_4.5H_2O$) dissolved in 100 cc. of water was slowly added to the siliceous amino compound slurry. A bluish dispersion formed which was almost completely soluble in the aqueous media. The resultant slurry was agitated for 15 minutes at a temperature of 80° to 85° C.

10.0 grams of 96% sulfuric acid diluted with 90 cc. of water was added dropwise to the slurry containing the copper sulfate. After the acid had been added, a sample of the slurry was removed and filtered. The pH of the filtrate was 10.1, whereupon 4 cc. of 96% sulfuric acid diluted with 20 cc. of water was added to the slurry. A sample of the filtrate obtained as before, had a pH of 7.5.

(E) *Recovery of the Metal Complexed Siliceous Amino Compound*

The bluish slurry was agitated for 15 minutes at a temperature of 80° to 85° C. and then filtered. The mother liquir filtrate had a slight bluish tint. The filter cake was washed four times by each time washing with 1500 cc. of water and filtering. The filtrate washes were colorless. Normally, if free amino groups are present, the filtrate washes would be yellowish. The filter cake was dried for approximately 20 hours at a temperature of 150° to 160° F. and was then ground to yield 115 grams of a light blue soft powder. The complexed siliceous amino compound had a copper content of 1.2% as determined by electrodeposition. This method of copper content determination is adequately discussed in "Instrumental Methods of Chemical Analysis," Ewing, second edition, page 224.

The procedure of this example was repeated except that no attempt was made to prepare a copper complexed siliceous amino compound.

The greases of this example were prepared by blending the oil and siliceous amino compound or metal complexed siliceous amino compound using a "Kitchen Aid Mixer," model #3C, manufactured by the Hobart Manufacturing Company. Thereafter the greases were homogenized using a Model M-8BA Manton-Gaulin laboratory homogenizer until the grease temperature reached between about 80° to 90° C.

When a grease prepared using 10% by weight of the copper complexed siliceous amino compound of this example, and 90% by weight of a 320 second Saybolt viscosity naphthenic base oil was compared to a grease prepared using the non-complexed siliceous amino compound of this example, it was found that the grease prepared using the copper complex became heavier during homogenization. On the other hand, greases prepared by using the non-complexed siliceous amino compound softened and ran considerably during homogenization.

EXAMPLE II

The procedure of Example I was substantially repeated except that a copper sheet weighing approximately 10 grams was used. In addition, the copper sheet was immersed in the slurry during the four washes. After the fourth wash, the slurry was digested in contact with the copper sheet for 16 hours. It was during this period of digestion that the definite blue coloration of the copper complex developed. The weight loss of the copper sheet was 1.0%. The copper complex of the siliceous amino compound had a copper content of 0.75% as determined by electrodeposition in the manner of Example I. To obtain a metal complexed siliceous amino compound having a copper content of 0.75%, the weight loss of the copper sheet should have been 7.5%. The variation is unexplained; however, it is possible that some copper silicate may have formed on the copper sheet, and this would account for the variations between the theoretical weight loss of the copper sheet and the actual weight loss.

EXAMPLE III

This example sets forth two identical preparations of siliceous amino compounds which were sub-divided in half to obtain a total of 4 portions, and used in Examples IV through VII. The preparation of the siliceous amino compound was accomplished using stoichiometric amounts of silicate salts and partial amides. The two preparations were as follows:

(A) Preparation of the Sodium Silicate Solution 291 grams of a 40° Bé. sodium silicate

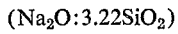
(Na$_2$O:3.22SiO$_2$)

solution was diluted with 1890 cc. of water and then heated with agitation to a temperature of from 85° to 90° C.

(B) Preparation of Partial Amide Salt 150 grams of the monoamide of hydrogenated tallow fatty acids and diethylene triamine was dispersed in 850 cc. of water at a temperature of from 80° to 85° C. 55.5 grams of glacial acetic acid was then added to the monoamide dispersion and the slurry was agitated at a temperature of from 90° to 95° C. An additional 500 cc. of water was then added to the partial amide acetate salt dispersion. The salt dispersion was then agitated at a temperature of from 95° to 97° C. until a uniform dispersion was obtained.

(C) Preparation of the Siliceous Amino Compound Slurry

The partial amide acetate salt dispersion, at a temperature of 95° to 97° C., was then slowly added to the silica TE solution which was at a temperature of 85° to 95° C. During the addition, the salt was constantly agitated. A fine yellowish precipitate formed. A sample of the slurry was removed and filtered. The pH of the filtrate was then determined to be approximately 8.2 and 1.0 cc. of 96% sulfuric acid was added to the slurry. A sample filtrate taken substantially as before had a pH of 7.7. The slurry was then agitated for one hour at a temperature of 85° to 90° C. The two preparations were then divided in half to yield four portions of equal weight and volume each containing approximately 116 grams of the siliceous amino compound.

EXAMPLE IV

(A) Preparation of the Metal Complexed Siliceous Amino Compound 6.0 grams of powdered nickel was added to one portion of the siliceous amino compound slurry prepared in Example III. The slurry containing the powdered nickel was agitated for one hour at a temperature of from 80° to 85° C. and then allowed to digest by standing overnight under room temperature conditions in order to increase the nickel complex formation.

(B) Recovery of the Complexed Siliceous Amino Compound

After the 22 hour digestion period, the slurry was heated with agitation to a temperature of from 80° to 85° C. and then filtered using a Büchner funnel and a 25" to 28" vacuum. The filter cake was washed four times to remove water-soluble salts, by each time agitating the solid material with 2,000 cc. of water for 20 minutes at a temperature of from 80° to 85° C. and then filtering as before. Since the filtrations were somewhat slow, 110 cc. of Varnish Makers' and Painters' Naphtha was added to the third and fourth wash to increase the rate of filtration. Prior to the fourth and last wash, the slurry was allowed to stand for approximately 2 hours in order to permit any unreacted powdered nickel to settle to the bottom of the reaction vessel. The slurry was then decanted from the settled powdered nickel and filtered for the last time. The nickel complex of the siliceous amino compound was dried for approximately 20 hours to a moisture content of 0.5% by weight at a temperature of 150° to 155° F. The resultant approximately 100 grams of product was then ground to a fine soft off-white powder.

EXAMPLE V 3.0 grams of powdered nickel, and 1.0 gram of nickel acetate as a catalyst to increase the nickel complex formation was added to the second portion of the siliceous amino compound slurry of Example III. The procedure of Example IV was then repeated. This nickel complex dried to a moisture content of 0.4% and ground to approximately 90 grams of a fine soft off-white powder.

EXAMPLE VI

The procedure of Example IV was repeated except that 2.7 grams of powdered chromium was added to the third portion of the siliceous amino compound slurry of Example III and no Varnish Makers' and Painters' Naphtha was used because the rate of filtration was more rapid than in the previous examples. The chromium complexed siliceous amino compound was dried to a moisture content of 0.8% and was then ground to approximately 100 grams of a fine soft off-white powder.

EXAMPLE VII

The procedure of Example IV was repeated except that 5.1 grams of powdered zinc was added to the fourth portion of the siliceous amino compound slurry prepared in Example III and no Varnish Makers' and Painters' Naphtha was used due to a satisfactory rate of filtration. The zinc complexed siliceous amino compound was dried to a moisture content of 0.7% and was then ground to approximately 100 grams of a fine soft off-white powder.

EXAMPLE VIII

This example sets forth three identical preparations of a siliceous amino compound which were used in preparing the metal complexed siliceous amino compounds of Examples IX through XI.

*(A) Preparation of Silicate Solution*

145.5 grams of a 40° Bé. sodium silicate $$(Na_2O:3.22SiO_2)$$

solution was diluted with 945 cc. of water and agitated at a temperature of from 85° to 90° C.

*(B) Preparation of the Partial Amide Salt*

75 grams of the monoamide of hydrogenated tallow fatty acids and diethylenetriamine was melted at a temperature of from 90° to 95° C. and 27.8 grams of glacial acetic acid was then added thereto to form the partial amide acetate salt which was then dissolved in 675 cc. of water at a temperature of 95° to 97° C.

*(C) Preparation of the Siliceous Amino Compound*

The partial amide acetate salt solution, at a temperature of 95° to 97° C., was slowly added to the agitated silicate solution at a temperature of 85° to 95° C. A fine yellowish precipitate formed. A sample from the slurry was removed and filtered. The pH of the sample filtrate was 8.0 and 0.2 cc. of 96% sulfuric acid was added to the slurry, and a filtrate sample taken as before. The pH of a filtrate taken from the slurry was now 7.8. The slurry was agitated for one hour at a temperature of 85° to 90° C.

EXAMPLE IX

*(A) Preparation of the Metal Complexed Siliceous Amino Compound*

3.1 grams of powdered metal cobalt was added to one of the three preparations of Example VIII. The mixture was agitated for one hour at a temperature of from 80° to 85° C. During the agitation, the yellowish slurry changed to a purplish slurry which was due to cobalt complex formation. The slurry was digested for 22 hours at room temperature in order to permit maximum cobalt complex formation. No free cobalt powder sediment was visible after the digestion.

*(B) Recovery of the Metal Complexed Siliceous Amino Compound*

The slurry was heated to a temperature of from 80° to 85° C. and was filtered. The filter cake was washed four times in order to remove water-soluble salts, by each time agitating the filter cake with 1500 cc. of water for 20 minutes at a temperature of from 80° to 85° C. and then filtering. The resultant cobalt complexed siliceous amino compound was dried to a moisture content of 0.7% at a temperature of from 150° to 155° C. The product was ground to approximately 110 grams of a fine soft purplish powder.

EXAMPLE X 6.2 grams of 30 mesh tin powder was added to the second siliceous amino compound slurry prepared in Example VIII. The procedure of Example IX was followed. The resultant tin complexed siliceous amino compound formed a light orange-yellow slurry. Prior to the fourth filtration, the slurry was allowed to stand so that any unreacted tin powder would settle. The slurry was then decanted from the unreacted tin powder. The resultant tin complexed siliceous amino compound was dried at a temperature of from 150 to 155° F. to a moisture content of 0.8%. The resultant approximately 100 grams of product was ground to a fine soft light yellow powder.

EXAMPLE XI

The procedure of Example IX was repeated using the third siliceous amino compound preparation of Example VIII, except that the digestion time was increased to 70 hours at room temperature. In addition, a cadmium stick having a 12 mm. base diameter and 100 mm. height and weighing 110.4580 grams was placed on the bottom of the reaction vessel, and no cobalt was used. After the last wash, the cadmium stick was rinsed with water and dried in a desiccator. The cadmium stick was again weighed and weighed 110.1600 grams thereby showing a weight loss of 0.2980 gram. The cadmium complex of the siliceous amino compound had a theoretical cadmium content of 0.27%. The cadmium complex was dried at 150° to 155° F. to a moisture content of 0.5% and was then ground to approximately 110 grams of a light yellowish fine soft powder.

EXAMPLE XII

The purpose of this example is to compare the grease prepared in Example I using a siliceous amino compound which did not contain any metal, with greases prepared using metal complexed siliceous amino compounds. All percentages are based upon the total weight of the oil used plus the weight of the siliceous amino compound or metal complexed siliceous amino compound used.

The greases were prepared by adding small portions of the non-complexed siliceous amino compound or the metal complexed siliceous amino compound to 25 grams of a 320 second Saybolt viscosity naphthenic base oil. The mixture was then stirred for one minute at 700 r.p.m. using a Cenco mechanical stirrer. After each portion was stirred for one minute, the mixture was inspected to determine if the oil-metal complexed or non-complexed siliceous amino compound still had free flowing characteristics. Portions of the metal complex or non-complexed siliceous amino compound were added and stirred as before until the mixture no longer had free flowing characteristics, that is, until a grease had been prepared. The weight of the metal complexed or non-complexed siliceous amino compound required to obtain the grease was then recorded. The amount of complexed or non-complexed siliceous amino compound required to form a grease with 25 grams of the oil is presented in the following table.

COMPOSITION OF GREASE

| Complexed or Uncomplexed Siliceous Amino Compound | Grams of Complexed or Uncomplexed Material | Percent by Weight of Complexed or Uncomplexed Material |
|---|---|---|
| Uncomplexed (Example I) | 10.0 | 28.6 |
| Nickel (Example IV) | 10.0 | 28.6 |
| Nickel-Nickel Acetate (Example V) | 10.0 | 28.6 |
| Cadmium (Example XI) | 8.5 | 25.3 |
| Cobalt (Example IX) | 8.2 | 24.7 |
| Chromium (Example VI) | 8.0 | 24.2 |
| Tin (Example X) | 8.0 | 24.2 |
| Zinc (Example VII) | 7.5 | 23.1 |

All of the greases were heated to temperatures of 150° to 200° C. and then cooled to a temperature of approximately 25° C. They were then worked with a spatula 60 times against the palm of the hand.

At the end of the 60 workings it was found that the grease prepared from a siliceous amino compound containing no complex, softened considerably. As compared with this, the greases containing metal complexed siliceous amino compounds softened only very slightly after the 60 workings.

The metal complexed siliceous amino compounds may be prepared by any operator without special skill or training. The uses for the novel compositions of this invention are many and varied. For example, the metal complexed siliceous amino compounds may be used as additives to metallic soap greases, as flatting agents for varnishes, lacquers, etc., as thickeners for plastics, and more particularly in polyester, epoxy and other resins for viscosity control and optimum thixotropy. In addition, their use is also suggested for bodying plastisols, organisols, and plastigels. Moreover, the thickening and thixotropic properties of the products suggest their use in coating systems to improve brushing and spraying qualities and reduce film sagging. These novel compositions may also be added to ceramic mixes to provide internal lubrication, easier mixing, faster die flow, and easier die release, and as an additive to ceramic dry materials to prevent caking during storage and to speed up the flow through speed hoppers. They may also be used as additives in printing inks to provide the proper balance of tack, penetration, and viscosity in lithographic and letter press inks. When added to silk screen inks, the compositions will enable optimum viscosity and penetration to be realized. Moreover, this product may have value as a thickener for textile printing pastes. The ability of these compositions to thicken mineral acid solutions makes possible their use in preparing paste type rust removers, etching agents, de-scalers, pickling agents, soldering fluxes, etc. The compositions of this invention are also extremely valuable as hardening agents for organic materials. For example, the least expensive waxes of mineral, vegetable, and animal origin can be up-graded by the addition of the compositions of this invention. The inclusion of even small percentages of the metallicly complexed siliceous amino compounds improves hardness, elevates the drop point and increases the hot melt viscosity of most waxes. These compositions are also useful in accelerating the cure time of rubber. Furthermore, the product is an excellent diluent and carrier for insecticidal powders. In this application, it has an advantage over the silicas in that it has decreased dusting properties. It gives the insecticidal powders improved adhesion to surfaces with less tendency to air scatter. When the compositions of this invention are incorporated into solvent based rubber cements they impart shortness and strength to the composition. When the products of this invention are added to either water or solvents they will assist in the suspension of pigments, fillers, and the like. When incorporated into paints and enamels, the products will help prevent the hard settling of heavy pigments. In addition to all of the above, the products will maintain the free-flowing properties of many dry powdered products over long periods of storage time. Moreover, the product may be used as a grinding aid with low melting point powders to dissipate the heat developed during grinding. Other suggested uses for the products of this invention are as stabilizers for molded brake linings, breaking industrial emulsions, bonding aids for cermets, redeposition of soil prevention in dry cleaning, anti-slip treatment for paper, slip control for textile fibers, anti-soil treatment for fabrics, drilling mud additives, thermal and nuclear insulation, wire and tube drawing, gas and vapor absorption and as catalysts.

While this invention has been described in terms of certain preferred embodiments and illustrated by means of specific examples, these are illustrative only; and the invention is not to be construed as limited, except as set forth in the following claims.

What I claim as new and desire to secure by Letters Patent is:

1. A composition of matter prepared in an aqueous system by contacting (1) a material comprising a partial amide salt having at least one primary amine group thereon, with at least stoichiometric quantities of (2) a water-soluble silicate salt selected from the class consisting of sodium silicates, potassium silicates, and ammonium silicates and then (3) contacting at a pH at least just in excess of 7, the product of (1) and (2), with a second material selected from the class consisting of the elements of the periodic table of group I-B, group II-A having an atomic weight of up to about 25, group II-B, group III-A having an atomic weight of at least about 25, group III-B having an atomic weight of up to about 89, group IV-A having an atomic weight of at least about 50, group IV-B, group V-A having an atomic weight of between about 120 and 210, group V-B, group VI-B having an atomic weight of up to about 100, group VIII, manganese and rhenium, water-soluble inorganic salts of said elements, and water-soluble organic salts of said elements wherein said organic salt has up to about 4 carbon atoms.

2. A composition of matter according to claim 1, wherein there is present up to about one mole of said second material for each mole of primary amine group originally present.

3. A composition of matter according to claim 1 wherein there is present up to about 95% by weight of silica based on said composition.

4. A composition of matter according to claim 1 wherein said metal is nickel.

5. A composition of matter according to claim 1 wherein said inorganic salt is copper sulfate.

6. A composition of matter according to claim 1 wherein said element is tin.

7. A composition of matter according to claim 1 wherein said element is zinc.

8. A composition of matter according to claim 1 wherein said element is cadmium.

9. A process of preparing a siliceous amino compound comprising contacting in an aqueous system (1) a material comprising a partial amide salt having at least one primary amine group thereon, at least stoichiometric quantities with respect to said partial amide of (2) a water-soluble silicate salt selected from the class consisting of sodium silicates, potassium silicates, and ammonium silicates, and (3) adding to the product of (1) and (2), at a pH at least just in excess of 7 a second material selected from the class consisting of the elements of the periodic table of group I-B, group II-A having an atomic weight of up to about 25, group II-B, group III-A having an atomic weight of at least about 25, group III-B having at atomic weight of up to about 89, group IV-A having an atomic weight of at least about 50, group IV-B, group V-A having an atomic weight of between about 120 and 210, group V-B, group VI-B having an atomic weight of up to about 100, group VIII, manganese and rhenium, water-soluble inorganic salts of said elements, and water-soluble organic salts of said elements wherein said organic salt has up to about 4 carbon atoms and thereafter recovering the resultant product.

10. A process according to claim 9 wherein there is present a third material selected from the class consisting of fluosilicic acid and water-soluble fluosilicate salts, said third material being present at the time of formation of the siliceous amino compound and before the addition of said second material.

11. A process according to claim 9 wherein said material and said water-soluble silicate salts are reacted in the presence of a substantially water-insoluble organic compound, said organic compound being liquid at the operating temperatures of the process.

12. A process according to claim 9 wherein said material is reacted with more than a stoichiometric amount of said water-soluble silicate salt.

13. A process according to claim 9 wherein the reaction of said material with said water-soluble silicate salts is accomplished in the presence of colloidal silica.

14. A process according to claim 9, including the steps of separating water from the slurry of the product of (1) and (2) with (3) to obtain a solid cake, and freezing said cake, thawing out said cake, and filtering the thawed out cake to remove additional water from said cake.

15. A process according to claim 9 wherein there is present up to about one mole of said second material for each mole of said primary amine group.

16. A process according to claim 9 wherein said second material is nickel.

17. A process according to claim 9 wherein said second material is copper sulfate.

18. A process according to claim 9 wherein said second material is tin.

19. A process according to claim 9 wherein said second material is zinc.

20. A process according to claim 9 wherein said second material is cadmium.

References Cited in the file of this patent
UNITED STATES PATENTS
2,967,828   Ihde _____ Jan. 10, 1961